B. GOODYEAR.
Seed Corn Safe.
No. 219,713.　　　　Patented Sept. 16, 1879.
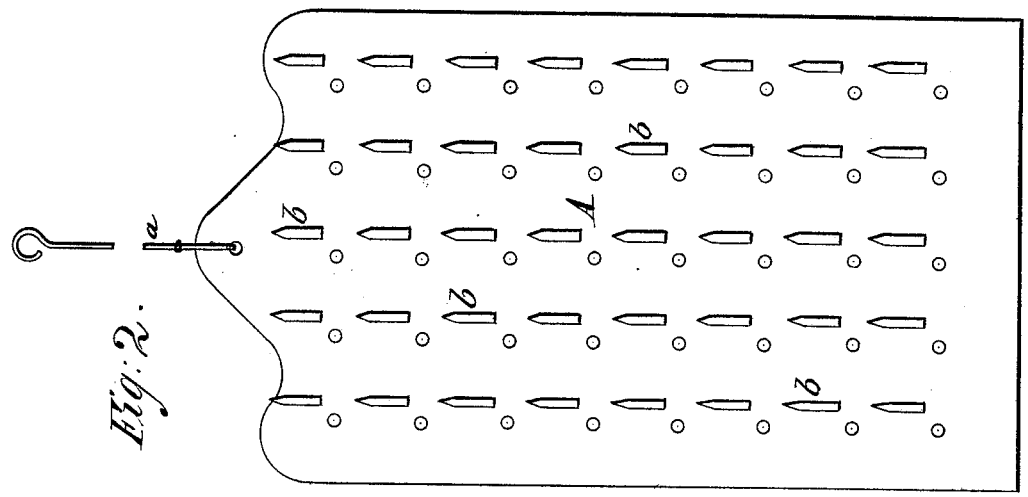
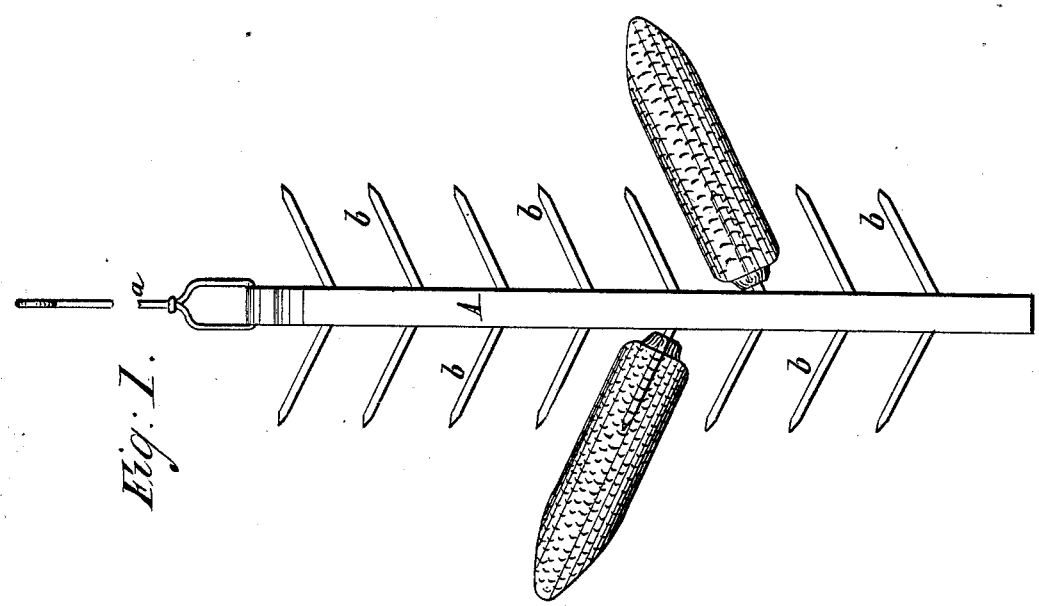
WITNESSES:　　　　　　　　　　INVENTOR:

UNITED STATES PATENT OFFICE.

BENJAMIN GOODYEAR, OF CARLISLE, PENNSYLVANIA.

IMPROVEMENT IN SEED-CORN SAFES.

Specification forming part of Letters Patent No. 219,713, dated September 16, 1879; application filed July 31, 1879.

*To all whom it may concern:*

Be it known that I, BENJAMIN GOODYEAR, of Carlisle, in the county of Cumberland and State of Pennsylvania, have invented a new and Improved Seed-Corn Safe, of which the following is a specification.

The object of my invention is to furnish means for holding and preserving corn selected for seed, whereby it shall be kept safely from rats and mice, and at the same time have opportunity for becoming thoroughly dry.

My invention consists in a board of suitable size fitted with projecting pins, and provided with a wire for being suspended. The ears of corn are placed on the pins. The space between them permits free circulation of air, and the safe, being suspended from a beam or similar support, is not accessible to rats and mice.

I will describe these features more particularly with reference to the accompanying drawings, wherein—

Figure 1 is an edge view of the safe, and Fig. 2 is a side view.

Similar letters of reference indicate corresponding parts.

A is a flat board of portable size, fitted at one end with a wire or cord, *a*, that is formed with a loop or hook, whereby the board can be suspended from a beam or other suitable support, it being only necessary that the board A shall not touch or be contiguous to any wall or other place; and as an additional means for preventing access of mice or rats to the board, the wire *a* may be fitted with a disk or inverted-cup-shaped flange.

Upon each side of board A are numerous pins, *b*, which project at an inclination upward and are pointed at their outer ends. These pins are rigid, and are arranged at a suitable distance apart, so that the ears of corn placed on them, as illustrated in Fig. 1, will not be in contact, and the air may have free access to all sides of the ears.

An ear of corn is to be placed on each pin *b* by entering the pin at the base of the cob. The ears will thus be held securely, the upward inclination of the pins preventing the ears from falling off, and each safe will hold a large amount of corn. The corn will dry rapidly when thus held, so that the risk of injury to the germ by frost will be lessened, and the corn will be secured from depredations by rats and mice.

I am aware that it is not new to make a bottle-rack of a series of vertical bars connected together by horizontal end bars, the said vertical end bars being provided with projections or pins, which enter the openings in the necks of the bottles; but

What I claim as new and of my invention is—

The improved corn-safe, consisting of the board A, provided with the suspension-wire *a*, and fitted with the rigid sharpened pins *b*, substantially as and for the purposes set forth.

BENJAMIN GOODYEAR.

Witnesses:
DAVID STROHM,
J. M. HAYS.